United States Patent
Ichikawa

(10) Patent No.: US 6,961,086 B1
(45) Date of Patent: Nov. 1, 2005

(54) PHOTOGRAPHING APPARATUS FOR CORRECTING WHITE BALANCE OF AN IMAGE SIGNAL AND A COLOR CORRECTION COEFFICIENT OF IMAGE DATA

(75) Inventor: Koji Ichikawa, Asaka (JP)

(73) Assignee: Fuji-Photo Film Co., LTD, Kanagawa (JP)

( * ) Notice: Subject to any disclaimer, the term of this patent is extended or adjusted under 35 U.S.C. 154(b) by 0 days.

(21) Appl. No.: 09/496,266

(22) Filed: Feb. 1, 2000

(30) Foreign Application Priority Data

Feb. 8, 1999 (JP) .................................. 11-030338

(51) Int. Cl.⁷ .......................... H04N 9/73; H04N 17/02; H04N 5/225; G03F 3/08
(52) U.S. Cl. .................. 348/223.1; 348/188; 348/360; 358/520
(58) Field of Search ............................ 348/188, 223.1, 348/224.1, 225.1, 177, 179, 182, 360, 361, 348/374; 358/518, 520, 523; 382/167

(56) References Cited

U.S. PATENT DOCUMENTS

| | | | | |
|---|---|---|---|---|
| 5,119,178 A | * | 6/1992 | Sakata et al. ............. | 348/223.1 |
| 5,142,359 A | * | 8/1992 | Yamamori .................... | 348/70 |
| 5,453,853 A | * | 9/1995 | Sakai et al. .................. | 358/518 |
| 5,982,423 A | * | 11/1999 | Sekiguchi ................ | 348/216.1 |
| 6,195,125 B1 | * | 2/2001 | Udagawa et al. ........ | 348/218.1 |
| 6,256,062 B1 | * | 7/2001 | Endo ........................ | 348/223.1 |
| 6,320,668 B1 | * | 11/2001 | Kim ............................ | 358/1.1 |
| 6,453,067 B1 | * | 9/2002 | Morgan et al. ............. | 382/162 |
| 6,542,185 B1 | * | 4/2003 | Bogardus .................. | 348/223.1 |
| 6,549,653 B1 | * | 4/2003 | Osawa et al. ................ | 382/162 |
| 2003/0160877 A1 | * | 8/2003 | Sumida .................... | 348/223.1 |
| 2003/0193564 A1 | * | 10/2003 | Jenkins ........................ | 348/182 |

FOREIGN PATENT DOCUMENTS

| | | | | | |
|---|---|---|---|---|---|
| EP | 437887 A1 | * | 7/1991 | .......... | H04N 5/232 |
| JP | 08029259 A | * | 2/1996 | ............. | G01J 3/51 |
| JP | A8 152566 | | 6/1996 | | |
| JP | A1 075458 | | 3/1998 | | |
| JP | 11168761 A | * | 6/1999 | .......... | H04N 17/02 |

* cited by examiner

Primary Examiner—Wendy R. Garber
Assistant Examiner—John M. Villecco
(74) Attorney, Agent, or Firm—Birch, Stewart, Kolasch & Birch, LLP

(57) ABSTRACT

A photographing apparatus provided with a picture-taking device which photographs a subject, includes a transmission type chart to be attached to the photographing apparatus and having at least a chromatic color portion; a storage device which stores a color reproduction target value for the chromatic color portion of the chart; and a correction device which corrects a color correction coefficient of image data obtained by photographing by the photographing apparatus, on the basis of image data obtained by photographing an achromatic color portion of a subject by the picture-taking device through the chromatic color portion of the chart and on the basis of the color reproduction target value stored in the storage device.

11 Claims, 8 Drawing Sheets

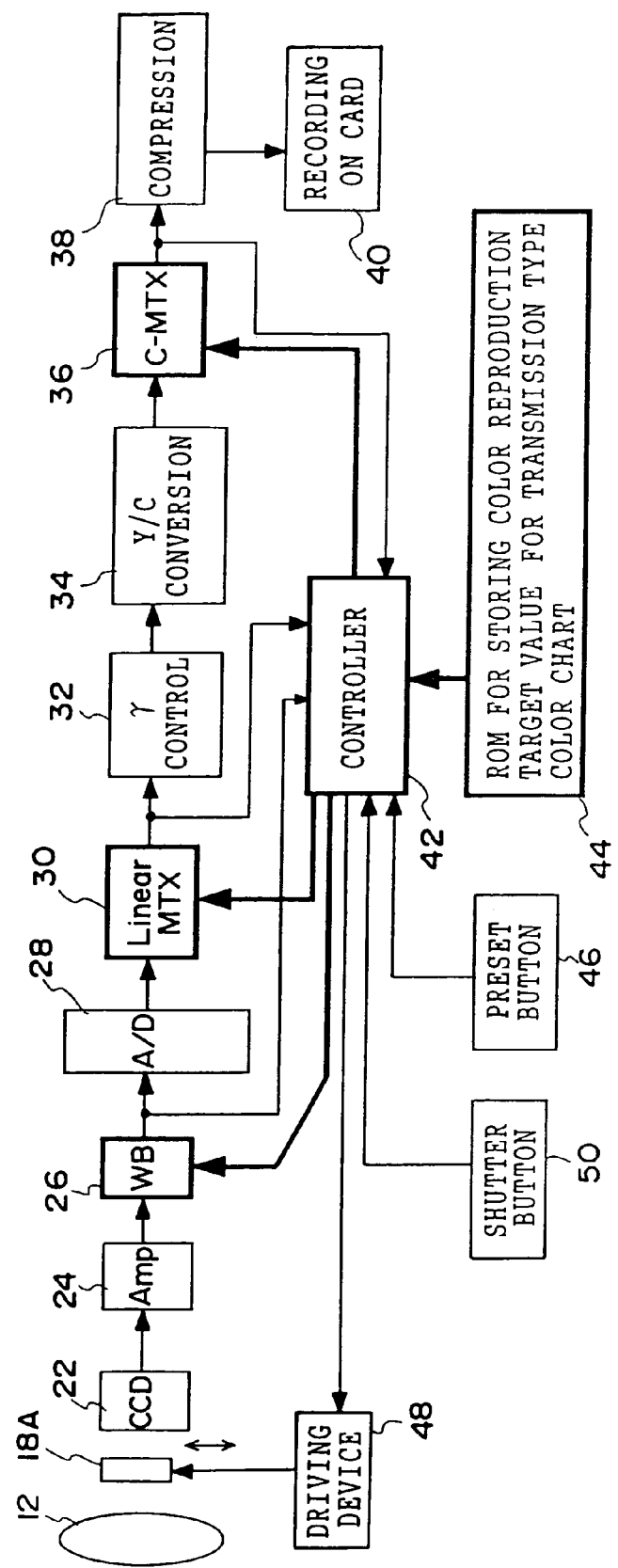
F I G. 1

F I G. 8 A
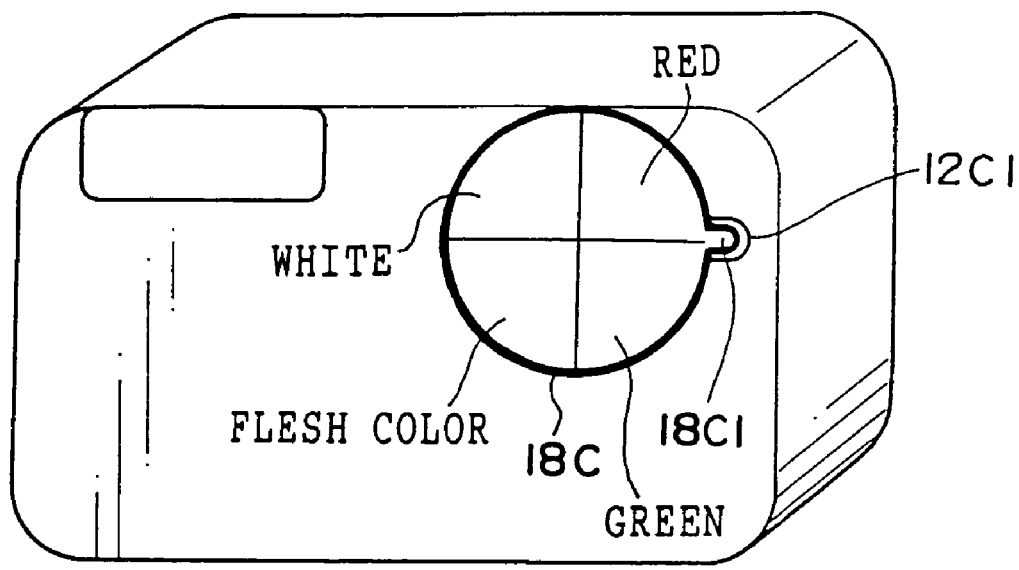
ATTACHED CORRECTLY
F I G. 8 B
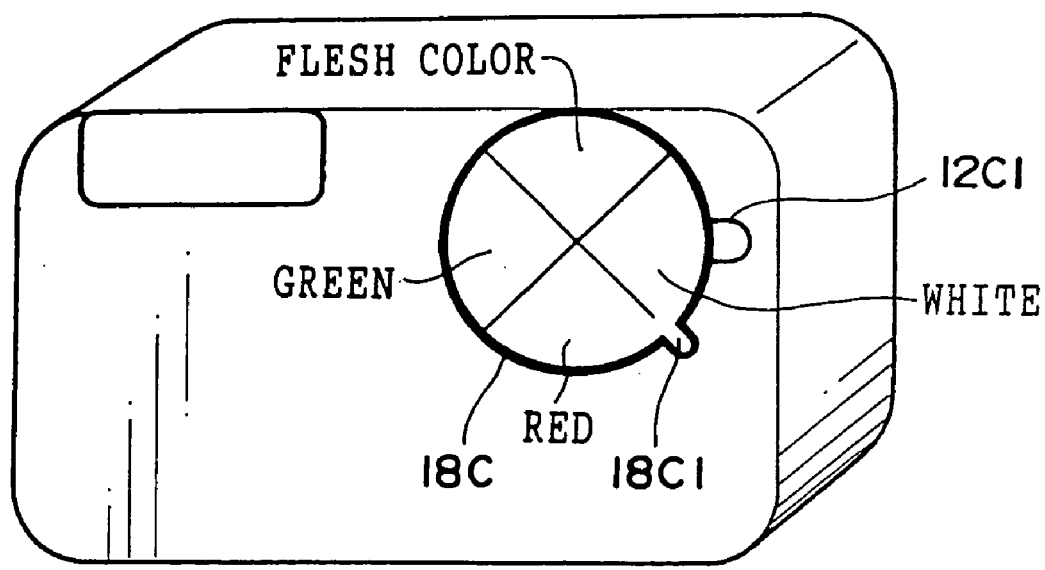
ATTACHED INCORRECTLY ND A COLOR
PHOTOGRAPHING APPARATUS FOR CORRECTING WHITE BALANCE OF AN IMAGE SIGNAL AND A COLOR CORRECTION COEFFICIENT OF IMAGE DATA

BACKGROUND OF THE INVENTION

1. Field of the Invention

The present invention relates to a photographing apparatus, and more particularly, to a photographing apparatus, which corrects white balance of an image signal and a color correction coefficient of image data.

2. Description of the Related Art

Conventionally, in a photographing apparatus such as an electronic camera, white balance correction is carried out inside a camera on the basis of photographed data which is obtained by a user photographing a white subject in full-frame, such that the white balance becomes a white balance which is optimal for the light source being used for photographing. In a conventional electronic camera or the like, white balance correction is performed, but color correction to make the color of the image, which is to be formed on the basis of the image data obtained by photographing a subject, the color that the subject would be if photographed under a light source having a good color rendering property, such as daylight, is not performed. Accordingly, when a photograph is taken in an environment such as under a fluorescent light, it is difficult to make the color of the image to be formed the color that the subject would be if photographed under a light source having a good color rendering property such as daylight. That is, color correction appropriate to the light source being used is not performed in a conventional electronic camera or the like.

A color correction device is described in Japanese Patent Application Laid-Open (JP-A) No. 10-75458, wherein a photographing position is brought to a position where a color chart having a plurality of colors recorded thereon is positioned, the color chart is photographed under the light source being used for photographing, and color correction is performed inside the camera. If there is a color for which weighting is particularly desired, a viewfinder displays a marker on the color chart image, and the marker is moved to the position of the color for which weighting is desired, so as to select the color.

An endoscopic apparatus is described in JP-A No. 8-152566, wherein a standard chart provided within a tightly closed chart box is photographed by a scope inserted into the tightly closed chart box, and then color adjustment of the apparatus is performed on the basis of the resulting photograph.

However, the above-mentioned two apparatuses have the troublesome point that a user must provide a special-purpose, separate chart.

SUMMARY OF THE INVENTION

In view of the aforementioned, an object of the present invention is to provide a photographing apparatus for which a user need not provide a special-purpose, separate chart, and which can correct the white balance of an image signal, and which can carry out correction of the color correction coefficient which correction is appropriate for the light source.

In order to accomplish the above object, a first aspect of the present invention is a photographing apparatus provided with a picture-taking device which photographs a subject, comprising a transmission type chart to be attached to the photographing apparatus and having at least a chromatic color portion; a storage device which stores a color reproduction target value for the chromatic color portion of the chart; and a correction device which corrects a color correction coefficient of image data obtained by photographing by the photographing apparatus, on the basis of image data obtained by photographing an achromatic color portion of a subject by the picture-taking device through the chromatic color portion of the chart and on the basis of the color reproduction target value stored in the storage device.

Namely, the transmission type chart is attached to the photographing apparatus. The chart may be built in the photographing apparatus, or coupled to the photographing apparatus by a cord or the like. The chart has at least a chromatic color portion. The chart is automatically or manually adjusted so that the chromatic color portion thereof is positioned on the optical axis of the picture-taking device as will be described later.

The storage device stores the color reproduction target value of the chromatic color portion of the chart.

The correction device corrects the color correction coefficient of the image data obtained by photographing by the picture-taking device, on the basis of the image data obtained by photographing an achromatic color portion of the subject and on the basis of the color reproduction target value of the chromatic color portion of the chart stored in the storage device.

Since the chart is attached to the photographing apparatus, the user need not provide a separate chart. Further, the color correction coefficient of the image data is corrected on the basis of the image data obtained by photographing an achromatic color portion of the subject though the chromatic portion of the chart and on the basis of the stored color reproduction target value for the chromatic color portion of the chart. Thus, correction of the color correction coefficient, which correction is appropriate for the light source, can be carried out.

A second aspect of the present invention is a photographing apparatus provided with a picture-taking device which photographs a subject, comprising a transmission type chart to be attached to the photographing apparatus and having at least one of a chromatic color portion and an achromatic color portion; and a correction device which corrects a white balance of an image signal obtained by photographing by the picture-taking device, on the basis of an image signal obtained by photographing an achromatic color portion of a subject by the picture-taking device through at least one of the chromatic color portion and the achromatic color portion of the chart.

Here, the chart of this aspect is also attached to the photographing apparatus, as is the chart of the first aspect. The chart of the second aspect has at least one of the chromatic portion and the achromatic portion. As will be described later, this chart is automatically or manually adjusted so that at least one of the chromatic portion and the achromatic portion is photographed by the picture-taking device.

The correction device corrects the white balance of the image signal obtained by photographing by the picture-taking device, on the basis of the image signal obtained by photographing an achromatic portion of the subject by the picture-taking device through at least one of the chromatic portion and the achromatic portion of the chart.

Since the chart is attached to the photographing apparatus, the user need not provide a separate chart. Further, the white balance of the image signal is corrected on the basis of the image signal obtained by photographing an achromatic color portion of the subject through at least one of the chromatic portion and the achromatic portion of the chart. Thus, correction of the white balance, which correction is appropriate for the light source, can be carried out.

In the present invention, preferably, the photographing apparatus further comprises a storage device which stores a color reproduction target value for the chromatic color portion of the chart, wherein the correction device also corrects a color correction coefficient of image data obtained by photographing by the picture-taking device, on the basis of image data obtained by photographing an achromatic color portion of a subject by the picture-taking device through the chromatic color portion of the chart and on the basis of the color reproduction target value for the chromatic color portion of the chart stored in the storage device. In this way, correction of the color correction coefficient, which correction is appropriate for the light source, can be carried out.

Since the chart is a transmission type chart as described above and since an achromatic portion of the subject is photographed through the chart, no adjustment for photographing the chart itself is required.

In the present invention, preferably, the photographing apparatus further comprises an input device which inputs an instruction to perform the correction; and a moving device which moves said chart onto an optical axis of said picture-taking device when the instruction to perform the correction is input from said input device, and moves said chart off of the optical axis of said picture-taking device when photographing is finished.

That is, when the instruction for the correction is input by the input device, the moving device moves the chart onto the optical axis of the picture-taking device, and when photographing is finished, the moving device withdraws the chart from the optical axis of the picture-taking device.

Since the chart is moved onto and off of the optical axis of the picture-taking device by the moving device, that is, since the chart is not positioned manually by a user, the user is not troubled by the task of positioning the chart.

In the present invention, preferably, the chart is substantially disc-shaped, and is structured so as to be rotatable around a shaft parallel to an optical axis of the picture-taking device, and has a chromatic color portion and an achromatic color portion, each having at least a single color, on a disc surface thereof; and the photographing apparatus further comprises a rotating device which rotates the chart such that the single-color chromatic color portion and the single-color achromatic color portion thereof are selectively positioned on the optical axis of the picture-taking device.

Since the chart is rotated by the rotating device in such a way that one of the chromatic portion and the achromatic portion of the chart are selectively positioned on the optical axis of the picture-taking device, that is, since the chart is not positioned manually by a user, the user is not troubled by the task of positioning the chart.

In the present invention, preferably, the picture-taking device includes a photographing lens; and the chart is structured so as to be able to be attached to the photographing lens when a predetermined position of the chart coincides with a predetermined position of the photographing lens.

Since the chart can be attached to the photographing lens when a predetermined position of the chart coincides with a predetermined position of the photographing lens, the chart can be properly positioned.

In the present invention, preferably, the chart is structured so as to have a chromatic color portion and an achromatic color portion, each having at least a single color, and such that the chromatic color portion and the achromatic color portion are selectively positioned on an optical axis of the picture-taking device; the photographing apparatus further comprises an identification device which identifies the portion of the chart positioned on the optical axis of the picture-taking device; and the correction device performs the correction on the basis of results of identification by the identification device.

Since the identification device identifies the portion of the chart positioned on the optical axis of the picture-taking device and correction is made on the basis of results of identification, the chart need not be properly positioned and the user is not troubled by the task of positioning the chart.

Preferably in the photographing apparatus of the present invention, the picture-taking device includes a photographing lens; the chart comprises a plurality of single-color charts, each having a single-color chromatic color portion or a single-color achromatic color portion; the single-color charts can be selectively attached to the photographing lens; the photographing apparatus further comprises an identification device which identifies the single-color chart attached to the photographing lens; and the correction device performs the correction on the basis of results of identification by the identification device.

In this structure, the identification device identifies the single-color chart attached to the photographing lens, and the correction is made on the basis of results of identification. Thus, even if the chart includes a plurality of single-color charts which each have a single-color chromatic color portion or a single-color achromatic color portion, there is no need to consider the order in which the plurality of single-color charts are attached, and the user has less trouble in attaching the chart.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a block diagram of an electronic camera relating to an embodiment of the present invention.

FIG. 8A illustrates a state in which the chart relating to the second variation of the present invention is correctly attached.

FIG. 8B illustrates a state in which the chart relating to the second variation of the present invention is incorrectly attached.

DESCRIPTION OF THE PREFERRED EMBODIMENTS

Figure 2:
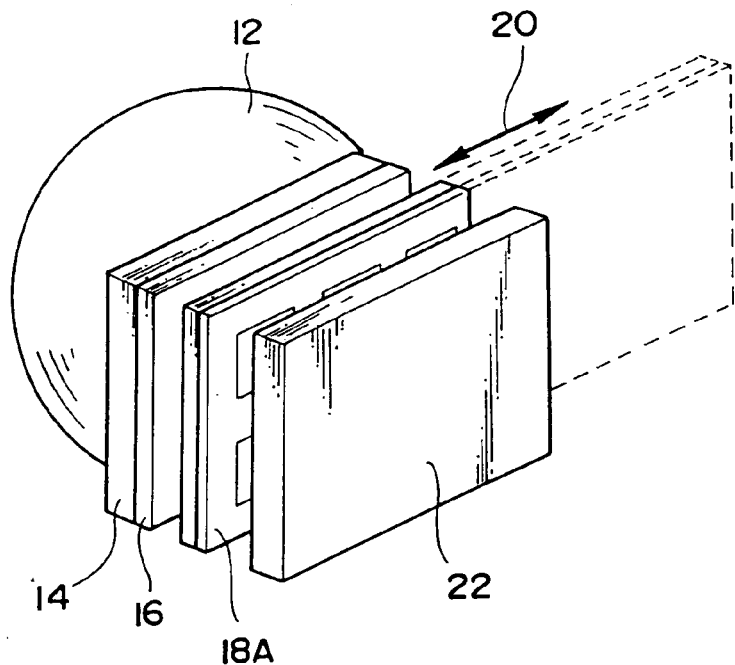
FIG. 2 illustrates the position at which a chart is placed.

Embodiments of the present invention are described in detail hereinafter with reference to the figures.

As shown in FIG. 1, an electronic camera (a photographing device) relating to an embodiment of the present invention comprises a lens 12, a two-dimensional CCD image sensor 22, an amplifier (AMP) 24 which amplifies an image signal from the two-dimensional CCD image sensor 22, a white balance correction circuit 26 which corrects the white balance of the amplified image signal, an A/D converter (A/D) 28 which converts into digital data the image signal whose white balance has been corrected, a linear matrix circuit 30 which corrects a color correction coefficient of the image data obtained by digital conversion, a γ control (correction) circuit 32 which performs γ control (correction) on the image data, a Y/C conversion circuit 34 which generates a luminance signal and a color-difference signal, a color matrix circuit 36 which further corrects the color correction coefficient of the image data which was not completely corrected at the linear matrix circuit 30, a compressor 38 which compresses the image data, and a card recorder 40 which records the compressed image data onto a card (not shown). The lens 12 and the two-dimensional CCD sensor 22 form the picture-taking device of the present invention.

The electronic camera also comprises a controller 42 which fetches the image signal from the white balance correction circuit 26, and then controls the white balance correction circuit 26 on the basis of the fetched image signal to correct the white balance of the image signal properly (appropriately to the light source). The controller 42 also fetches the image data output from the linear matrix circuit 30 and the color matrix circuit 36, and then controls the linear matrix circuit 30 and the color matrix circuit 36 on the basis of the fetched image data to correct the color correction coefficient of the image data properly (appropriately to the light source). A ROM 44, which serves as a storage device and stores a color reproduction target value for a transmission type color chart 18A (see FIG. 3) which will be described later, is connected to the controller 42. The controller 42 optimizes the color correction coefficient on the basis of the color reproduction target value stored in the ROM 44. The white balance correction circuit 26, the linear matrix circuit 30 and the color matrix circuit 36 form the correction device of the present invention.

A shutter button 50 and a preset button 46 which serves as an input device, as well as a driving device 48 which moves the transmission type color chart 18A (to be described later) onto and off of an optical axis, are also connected to the controller 42.

That is, as shown in FIG. 2, the driving device 48 makes the transmission type color chart 18A move onto and withdraw from the optical axis of the lens 12 (between the lens 12 and the two-dimensional CCD image sensor 22) so as to move the chart in a direction 20 which is perpendicular to the optical axis. An optical low-pass filter 14 and an IR cutting filter 16 (neither of which are illustrated in FIG. 1) are inserted between the lens 12 and the two-dimensional CCD image sensor 22 as in FIG. 2.

Alternatively, the driving device 48 may move the transmission type color chart 18A onto and off of the optical axis between the lens 12 and the subject to be photographed.

Figure 3:
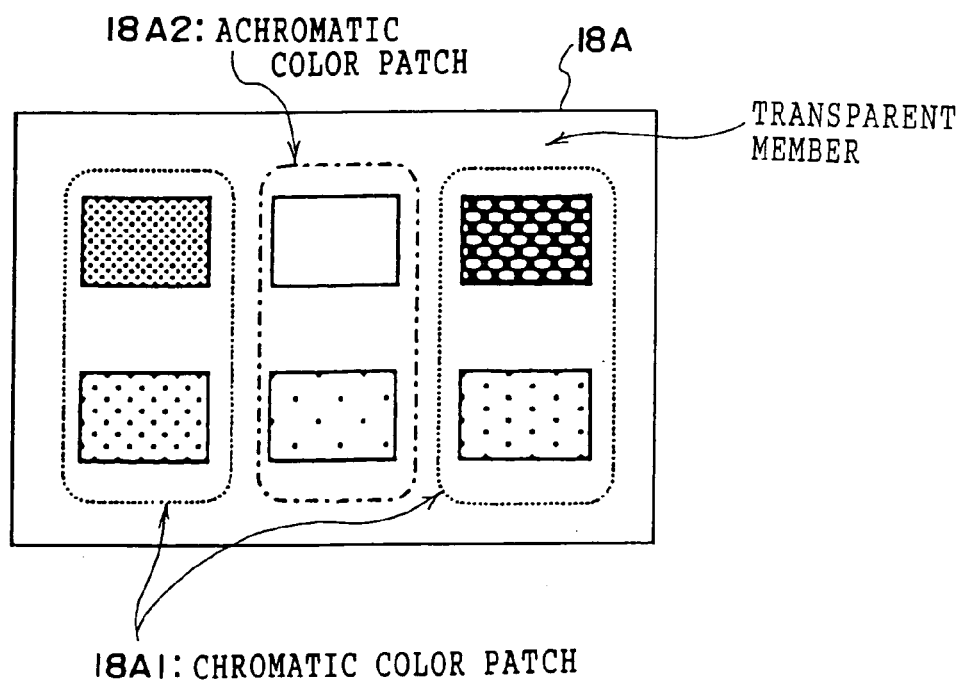
FIG. 3 illustrates the chart.

As shown in FIG. 3, the transmission type color chart 18A is formed of a transparent member having thereon a plurality of chromatic color patches (two patches in FIG. 3) 18A1, each having a plurality of chromatic portions (two portions in FIG. 3), and an achromatic color patch 18A2 having a plurality of achromatic color portions having different transmittances (two portions in FIG. 3). The numbers of chromatic and achromatic color patches and the numbers of color portions therein are not limited to those used above.

Figure 4:
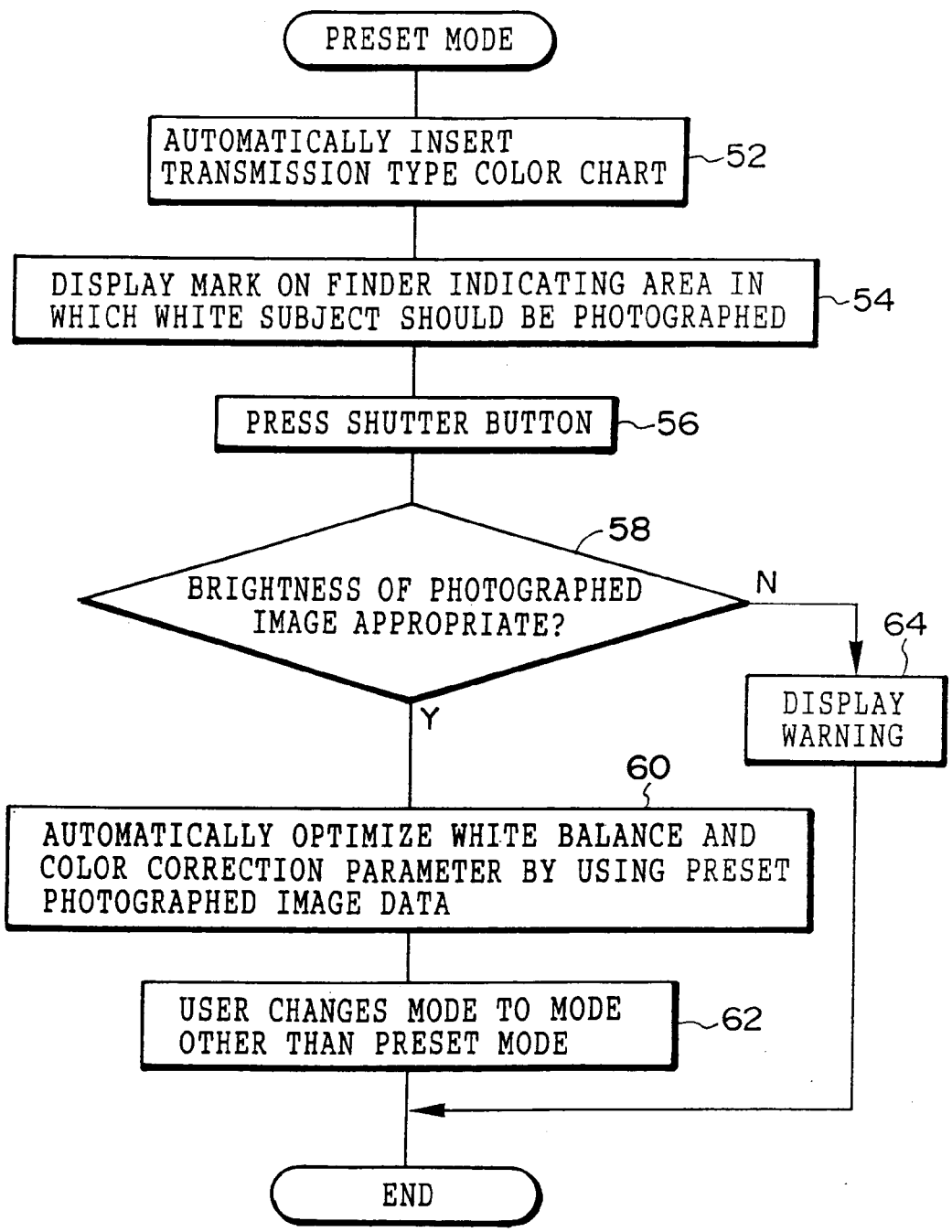
FIG. 4 is a flow chart illustrating a preset-mode processing routine relating to an embodiment of the present invention.

The operation of the embodiment of the present invention, in particular, the preset-mode processing routine shown in FIG. 4 and executed by the controller 42 will now be explained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The routine starts when the preset button 46 is pressed (turned on). The transmission type color chart 18 A is inserted onto the optical axis in step 52, and a mark indicating the area in which a white (or gray) subject should be photographed is displayed in a finder (not shown) in step 54.

When the mark indicating the area in which the white (or gray) subject should be photographed is displayed in the finder, the user sets the angle of view with reference to the mark so that the white (or gray) subject is in the designated area, and then presses the shutter button 50 (step 56). An image of the subject is thereby formed on the two-dimensional CCD image sensor 22, and, as described above, an image signal is input from the white balance correction circuit 26. In step 58, a determination as to whether the brightness of the photographed image is appropriate or not is made on the basis of the image signal. If the brightness of the photographed image is appropriate, the routine advances to step 60. If the brightness of the photographed image is excessive or insufficient, a warning is displayed in step 64 to urge the user to adjust the brightness. Then, the user presses the preset button 46 again and repeats the above process.

In step 60, the white balance and the color correction parameter are automatically optimized by using the image signal obtained by photographing the white (or gray) subject through the transmission type color chart 18A and the image data (preset photographed image data).

That is, the image signal from the white balance correction circuit 26 is fetched, and the white balance correction circuit 26 is controlled on the basis of the fetched image signal, so as to correct the white balance of the image signal properly (appropriately to the light source). In this case, white balance is corrected for each of the image signals obtained by photographing the white (or gray) subject through two types of achromatic color portions having different brightnesses, and the average of the corrected white balance data is taken.

The color correction coefficient of the image data is corrected properly (appropriately to the light source) by controlling the linear matrix circuit 30 on the basis of the color reproduction target value stored in the ROM 44 and the image data output from the linear matrix circuit 30. There are times when the color correction coefficient cannot be corrected sufficiently at the linear matrix circuit 30. Therefore, in the present embodiment, the color correction coefficient of the image data is corrected properly (appropriately to the light source) by controlling the color matrix circuit 36 on the basis of the color reproduction target value stored in the ROM 44 and the image data output from the color matrix circuit 36. In this case, a color correction coefficient is calculated respectively for each of the image data obtained by photographing the white (or gray) subject through the two types of chromatic color portions of each of the two chromatic color patches 18A, and finally, an optimization operation is performed by using the least squares method or the like to determine the final color correction coefficient.

The user, then, changes the mode to a mode other than the preset mode in step 62. Accordingly, the driving device 48 withdraws the transmission type color chart 18A from the optical axis.

As explained above, according to the present embodiment, since the transmission type color chart is built in the electronic camera, the user need not ready a separate chart for use. Further, since the color correction coefficient of the image data is corrected on the basis of the image data obtained by photographing an achromatic color portion of the subject though the chromatic portion of the chart and on the basis of the stored color reproduction target value of the chromatic color portion of the chart, correction of the color correction coefficient, which correction is appropriate for the light source, can be carried out. Moreover, since the white balance of the image signal is corrected on the basis of the image signal obtained by photographing an achromatic color portion of the subject though the achromatic portion of the chart, correction of the white balance, which correction is appropriate for the light source, can be carried out.

The correction of the white balance may be made on the basis of an image signal obtained by photographing an achromatic color portion of the subject though the chromatic portion of the chart. In this case, the achromatic portion of the chart can be omitted from the chart to simplify the structure thereof.

Since the chart is inserted onto and withdrawn from the optical axis by the driving device, that is, since the chart is not positioned manually by the user, the user is not troubled by the task of positioning the chart.

Since the chart is a transmission type chart and an achromatic color portion of the subject can be photographed through the chart, no adjustment for photographing the chart itself is required.

Variations of the present invention will be described hereinafter.

Figure 5:
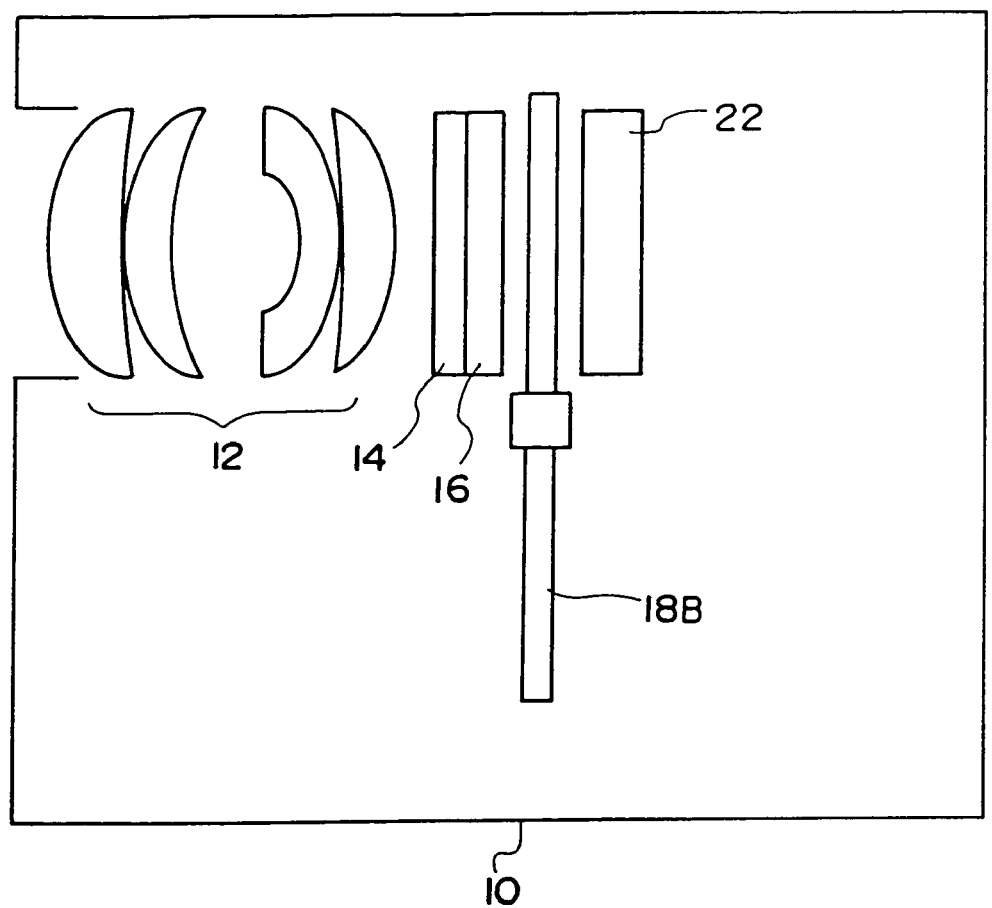
FIG. 5 illustrates the position at which a chart relating to a first variation of the present invention is placed.
Figure 6:
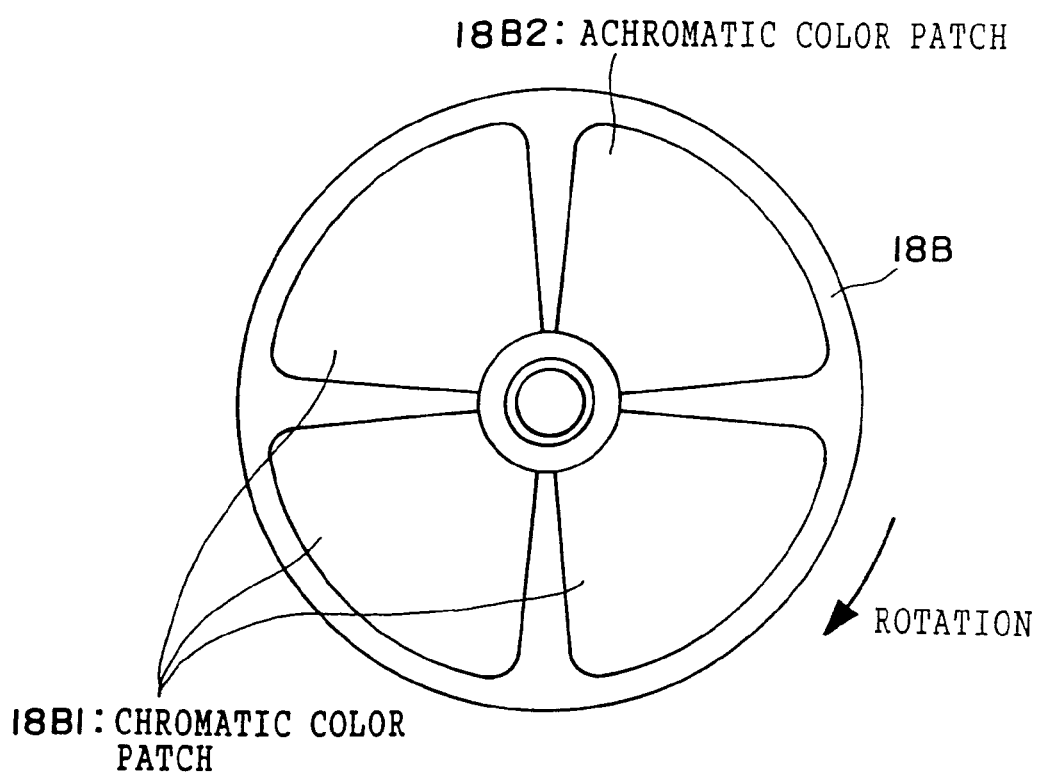
FIG. 6 illustrates the chart relating to the first variation of the present invention.

FIG. 5 shows a position of placement of a transmission type color chart relating to a first variation. FIG. 6 shows a transmission type color chart 18B relating to the first variation. As shown FIGS. 5 and 6, the transmission type color chart 18B is formed in a disc-like shaped so as to be rotatable around a shaft parallel to the optical axis of the lens 12. A plurality of chromatic color patches 18B1 (three patches in FIG. 6) and a single achromatic patch 18B2 are formed on the disc surface of the transmission type color chart 18B. The transmission type color chart 18B is rotated by a rotating device (not shown) in such a way that any one of the chromatic color patches 18B1 and the achromatic color patch 18B2 thereof is selectively positioned on the optical axis of the lens 12.

In the first variation as well, since the chromatic color patches 18B1 are not positioned manually by a user, the user is not troubled by the task of positioning the chart.

Figure 7:
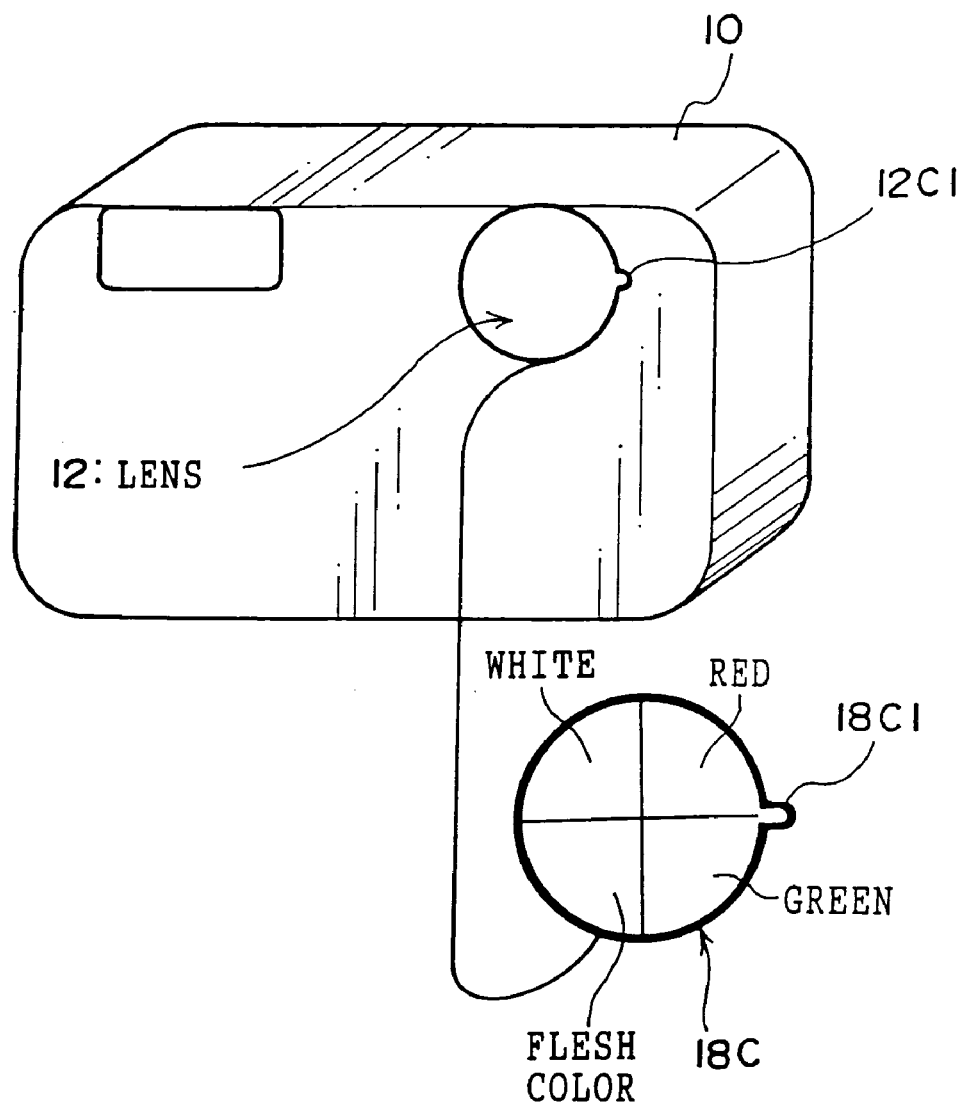
FIG. 7 illustrates the position at which a chart relating to a second variation of the present invention is placed, and the chart relating to the second variation.

FIG. 7 shows a position at which a transmission type color chart 18C relating to a second variation of the present invention is disposed, and the transmission type color chart 18C. In the second variation, the transmission type color chart 18C is coupled to the lens 12 by a cord rather than being built in the electronic camera 10.

As shown in FIG. 7, the transmission type color chart 18C relating to the second variation has formed thereon four chromatic color portions: a white portion, a red portion, a flesh color portion, and a green portion. The transmission type color chart 18C is structured so as to be able to be attached to the lens 12 when a protruding portion 18C1 of the transmission type color chart 18C coincides with a protruding portion 12C1 of a guide of the lens 12.

That is, as shown in FIG. 8A, when the protruding portion 18C1 of the transmission type color chart 18C coincides with the protruding portion 12C1 of a guide of the lens 12, the chart 18C is correctly attached to the lens 12, but when the protruding portion 18C1 of the transmission type color chart 18C does not coincide with the protruding portion 12C1 of the guide of the lens 12, the chart 18C cannot be attached to the lens 12.

Thus, since the transmission type color chart 18C is structured so as to be able to be attached to the lens 12 when the protruding portion 18C1 of the transmission type color chart 18C coincides with the protruding portion 12C1 of a guide of the lens 12, the transmission type color chart 18C can be properly positioned.

Instead of making the transmission type color chart 18C attachable to the lens 12 when the protruding portion 18C1 of the transmission type color chart 18C coincides with the protruding portion 12C1 of a guide of the lens 12, the transmission type color chart 18C may be structured so as to be attachable to the lens 12 in any position. In this case, the portion of the transmission type color chart which is on the optical axis is identified, and then the above corrections (of the white balance and the color correction coefficient) are performed on the basis of the results of identification. Thus, the chart need not be properly positioned, and the user is not troubled by the task of positioning the chart. In this case, the portion of the transmission type color chart on the optical axis is identified by processing the image signal so as to recognize the color of the portion of the chart.

Figure 9:
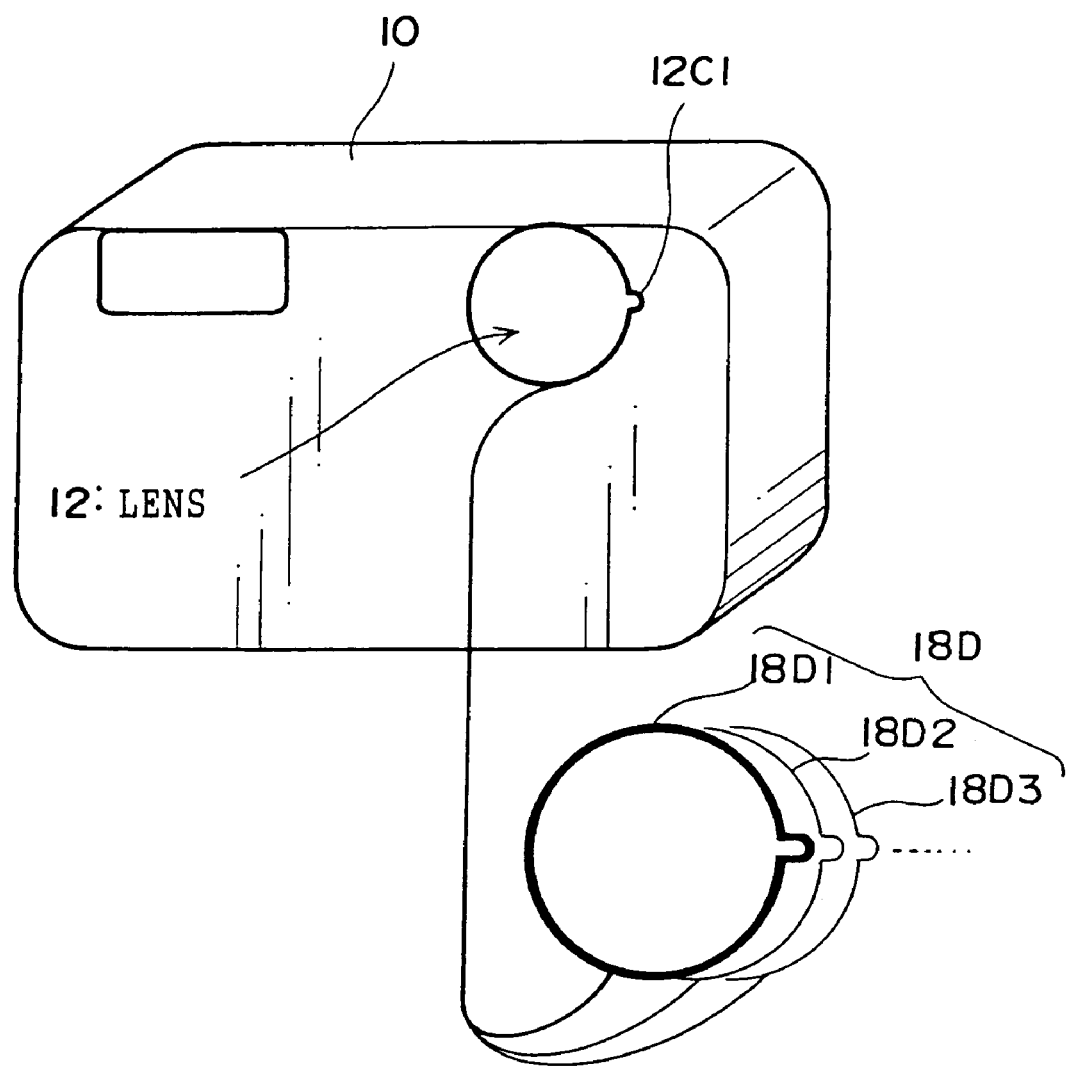
FIG. 9 illustrates the position at which a chart relating to a third variation of the present invention is placed, and the chart relating to the third variation.

FIG. 9 shows the position at which a transmission type color chart 18D relating to a third variation of the present invention is placed, and the transmission type color chart 18D. The transmission type color chart 18D relating to the third variation comprises a plurality of single-color charts 18D1, 18D2, 18D3 . . . , each having a chromatic color portion or an achromatic color portion. The single-color charts 18D1, 18D2, 18D3 . . . can be selectively attached to the lens 12 when a predetermined position of the chart coincides with a predetermined position of the lens 12 in the same way as described above. The single-color charts 18D1, 18D2, 18D3 . . . are coupled to the electronic camera 10 by cords. In this case, which one of the single-color charts is attached to the lens 12 is identified, and then the above corrections are performed on the basis of the results of the identification. Thus, there is no need to consider the order in which the single-color charts are attached, and attaching the chart is less trouble for the user. In this case, which one of the single-color charts 18D1, 18D2, 18D3, . . . is attached to the lens 12 is identified by processing the image signal to identify the color of the attached chart.

While the present invention has been described by using an electronic camera as an example, the present invention is not limited to this example, and can be applied to a video camera, an endoscopic apparatus, and the like.

What is claimed is:

1. A photographing apparatus provided with a picture-taking device which photographs a subject, comprising:
   a transmission type chart to be attached to said photographing apparatus and having at least a chromatic color portion;
   a storage device which stores a color reproduction target value for the chromatic color portion of said chart; and
   a correction device which corrects a color correction coefficient of image data obtained by photographing by said photographing apparatus, on the basis of image data obtained by photographing an achromatic color portion of a subject by said picture-taking device through the chromatic color portion of said chart and on the basis of the color reproduction target value stored in said storage device,
   wherein said chart is substantially disc-shaped, and is structured so as to be rotatable around a shaft parallel to an optical axis of said picture-taking device, and has a chromatic color portion and anachromatic color portion, each having at least a single color, on a disc surface thereof; and
   said photographing apparatus further comprises a rotating device which rotates said chart such that the single-color chromatic color portion and the single-color achromatic color portion thereof are selectively positioned on the optical axis of said picture-taking device.

2. A photographing apparatus according to claim 1, wherein:
   said chart is structured so as to have a chromatic color portion and an achromatic color portion, each having at least a single color, and such that the chromatic color portion and the achromatic color portion are selectively positioned on the optical axis of said picture-taking device;
   said photographing apparatus further comprises an identification device which identifies the portion of said chart positioned on the optical axis of said picture-taking device; and
   said correction device performs the correction on the basis of results of identification by said identification device.

3. A photographing apparatus provided with a picture-taking device which photographs a subject, comprising:
   a transmission type chart to be attached to said photographing apparatus and having at least a chromatic color portion;
   a storage device which stores a color reproduction target value for the chromatic color portion of said chart; and
   a correction device which corrects a color correction coefficient of image data obtained by photographing by said photographing apparatus on the basis of image data obtained by photographing an achromatic color portion of a subject by said picture-taking device through the chromatic color portion of said chart and on the basis of the color reproduction target value stored in said storage device,
   wherein said chart is structured so as to have a chromatic color portion and an achromatic color portion, each having at least a single color, and such that the chromatic color portion and the achromatic color portion are selectively positioned on an optical axis of said picture-taking device;
   said photographing apparatus further comprises an identification device which identifies the portion of said chart positioned on the optical axis of said picture-taking device; and
   said correction device performs the correction on the basis of results of identification by said identification device.

4. A photographing apparatus according to claim 3, further comprising:
   an input device which inputs an instruction to perform the correction; and
   a moving device which automatically moves said chart onto an optical axis of said picture-taking device in response to the instruction to perform the correction being input from said input device, and automatically moves said chart off of the optical axis of said picture-taking device in response to photographing being finished.

5. A photographing apparatus provided with a picture-taking device which photographs a subject, comprising:
   a transmission type chart to be attached to said photographing apparatus and having at least a chromatic color portion;
   a storage device which stores a color reproduction target value for the chromatic color portion of said chart; and
   a correction device which corrects a color correction coefficient of image data obtained by photographing by said photographing apparatus, on the basis of image data obtained by photographing an achromatic color portion of a subject by said picture-taking device through the chromatic color portion of said chart and on the basis of the color reproduction target value stored in said storage device,
   wherein said picture-taking device includes a photographing lens;
   said chart comprises a plurality of single-color charts, each having a single-color chromatic color portion or a single-color achromatic color portion;
   the single-color charts can be selectively attached to the photographing lens;
   said photographing apparatus further comprises an identification device which identifies the single-color chart attached to the photographing lens; and
   said correction device performs the correction on the basis of results of identification by said identification device.

6. A photographing apparatus according to claim 5, wherein: said picture-taking device includes a photographing lens; and
   said chart is structured so as to be able to be attached to the photographing lens when a predetermined position of said chart coincides with a predetermined position of the photographing lens.

7. A photographing apparatus provided with a picture-taking device which photographs a subject, comprising:
   a transmission type chart to be attached to said photographing apparatus and having at least one of a chromatic color portion and an achromatic color portion; and
   a correction device which corrects a white balance of an image signal obtained by photographing by said picture-taking device, on the basis of an image signal obtained by photographing an achromatic color portion of a subject by said picture-taking device through at least one of the chromatic color portion and the achromatic color portion of said chart, wherein said chart is substantially disc-shaped, and is structured so as to be rotatable around a shaft parallel to an optical axis of said picture-taking device, and has a chromatic color portion and an achromatic color portion, each having at least a single color, on a disc surface thereof; and said photographing apparatus further comprises a rotating device which rotates said chart such that the single-color chromatic color portion and the single-color achromatic color portion thereof are selectively positioned on the optical axis of said picture-taking device.

8. A photographing apparatus provided with a picture-taking device which photographs a subject, comprising:

a transmission type chart to be attached to said photographing apparatus and having at least one of a chromatic color portion and an achromatic color portion; and a correction device which corrects a white balance of an image signal obtained by photographing by said picture-taking device, on the basis of an image signal obtained by photographing an achromatic color portion of a subject by said picture-taking device through at least one of the chromatic color portion and the achromatic color portion of said chart, wherein said chart is structured so as to have a chromatic color portion and an achromatic color portion, each having at least a single color, and such that the chromatic color portion and the achromatic color portion are selectively positioned on an optical axis of said picture-taking device;

said photographing apparatus further comprises an identification device which identifies the portion of said chart positioned on the optical axis of said picture-taking device; and said correction device performs the correction on the basis of results of identification by said identification device.

9. A photographing apparatus according to claim 8, further comprising a storage device which stores a color reproduction target value for the chromatic color portion of said chart, wherein said correction device also corrects a color correction coefficient of image data obtained by photographing by said picture-taking device, on the basis of image data obtained by photographing an achromatic color portion of a subject by said picture-taking device through the chromatic color portion of said chart and on the basis of the color reproduction target value for the chromatic color portion of said chart stored in said storage device.

10. A photographing apparatus according to claim 8, further comprising:

an input device which inputs an instruction to perform the correction; and a moving device which automatically moves said chart onto an optical axis of said picture-taking device when in response to the instruction to perform the correction is being input from said input device, and automatically moves said chart off of the optical axis of said picture-taking device when in response to photographing is being finished.

11. A photographing apparatus according to claim 8, wherein:

said picture-taking device includes a photographing lens; and said chart is structured so as to be able to be attached to the photographing lens when a predetermined position of said chart coincides with a predetermined position of the photographing lens.

* * * * *